(12) United States Patent
Woodruff et al.

(10) Patent No.: US 12,070,899 B2
(45) Date of Patent: Aug. 27, 2024

(54) THREE-DIMENSIONAL PRINTING WITH REDOX-ACTIVE INORGANIC SALTS

(71) Applicant: Hewlett-Packard Development Company, L.P., Spring, TX (US)

(72) Inventors: Shannon Reuben Woodruff, San Diego, CA (US); Emre Hiro Discekici, San Diego, CA (US); Graciela Emma Negri Jimenez, San Diego, CA (US); Alay Yemane, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 213 days.

(21) Appl. No.: 17/637,658

(22) PCT Filed: Oct. 23, 2019

(86) PCT No.: PCT/US2019/057534
§ 371 (c)(1),
(2) Date: Feb. 23, 2022

(87) PCT Pub. No.: WO2021/080573
PCT Pub. Date: Apr. 29, 2021

(65) Prior Publication Data
US 2022/0274330 A1 Sep. 1, 2022

(51) Int. Cl.
| | |
|---|---|
| *B29C 64/165* | (2017.01) |
| *B29C 64/264* | (2017.01) |
| *B33Y 10/00* | (2015.01) |
| *B33Y 30/00* | (2015.01) |
| *B33Y 70/10* | (2020.01) |

(Continued)

(52) U.S. Cl.
CPC .......... *B29C 64/165* (2017.08); *B29C 64/264* (2017.08); *B33Y 10/00* (2014.12); *B33Y 30/00* (2014.12); *B33Y 70/10* (2020.01); *B29K 2105/0032* (2013.01); *B29K 2105/005* (2013.01); *B29K 2105/251* (2013.01); *B29K 2505/08* (2013.01)

(58) Field of Classification Search
None
See application file for complete search history.

(56) References Cited

FOREIGN PATENT DOCUMENTS

| | | |
|---|---|---|
| CN | 102020316 A | 4/2011 |
| CN | 104285146 A | 1/2015 |

(Continued)

OTHER PUBLICATIONS

Pavlyuchenkova, L.P., "Analytical Chemistry," Khabarovsk, RITs KhGAEP, 2003, pp. 1-155.

*Primary Examiner* — Yung-Sheng M Tsui
(74) *Attorney, Agent, or Firm* — HP Inc. Patent Department

(57) ABSTRACT

This disclosure describes three-dimensional printing kits, methods of making three-dimensional printed objects, and systems for three-dimensional printing. In one example, a three-dimensional printing kit can include a powder bed material and a fusing agent to selectively apply to the powder bed material. The powder bed material can include polymer particles and a redox-active inorganic salt mixed with the polymer particles. The fusing agent can include water and an electromagnetic radiation absorber, wherein the electromagnetic radiation absorber absorbs electromagnetic radiation energy and converts the electromagnetic radiation energy to heat.

18 Claims, 3 Drawing Sheets

(51) Int. Cl.
    *B29K 105/00*    (2006.01)
    *B29K 505/08*    (2006.01)

(56)            References Cited

FOREIGN PATENT DOCUMENTS

| CN | 107367509 A | 11/2017 | |
|---|---|---|---|
| DE | 10320464 B4 * | 4/2008 | ............ B22F 1/0003 |
| WO | WO1996005038 A1 * | 8/1995 | |
| WO | WO-2017014785 A1 * | 1/2017 | ......... B29C 35/0805 |
| WO | 2017/213666 A1 | 12/2017 | |
| WO | 2019/051205 A1 | 3/2019 | |
| WO | 2019/067471 A2 | 4/2019 | |

* cited by examiner

THREE-DIMENSIONAL PRINTING WITH REDOX-ACTIVE INORGANIC SALTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. Three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensional print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
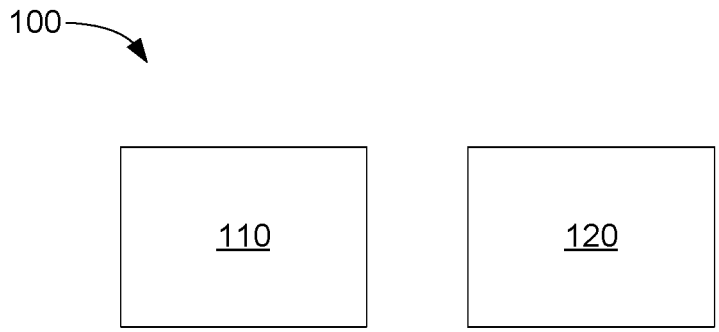
FIG. 1 is a schematic view of an example three-dimensional printing kit in accordance with examples of the present disclosure.

The present disclosure describes three-dimensional printing kits, methods, and systems for three-dimensional printing. The materials, methods, and systems described herein can be used to make three-dimensional printed sensors that can detect metal ions. Specifically, a redox-active inorganic salt can be mixed with a polymer powder bed material for forming the three-dimensional printed sensors. The redox-active inorganic salt can react with a target metal cation to form a colored pigment, which can visually indicate the presence of the target metal cation. In one example, a three-dimensional printing kit includes a powder bed material and a fusing agent to selectively apply to the powder bed material. The powder bed material includes polymer particles and a redox-active inorganic salt mixed with the polymer particles. The fusing agent includes water and an electromagnetic radiation absorber. The electromagnetic radiation absorber absorbs electromagnetic radiation energy and converts the electromagnetic radiation energy to heat. In some examples, the redox-active inorganic salt can be reactive with a target metal cation to form a water-insoluble colored pigment. The target metal cation can be $Fe^{2+}$, $Fe^{3+}$, $Zn^{2+}$, $Cu^{2+}$, or $Ba^{2+}$. In certain examples, the redox-active inorganic salt can be $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$. In further examples, the redox-active inorganic salt can be present in the powder bed material in an amount from about 0.05 wt % to about 5 wt %. In other examples, the powder bed material can further include titanium dioxide in an amount from about 1 wt % to about 5 wt %. In other examples, the fusing agent can be a colorless fusing agent or a low tint fusing agent.

The present disclosure also describes methods of making three-dimensional printed objects. In one example, a method of making a three-dimensional printed object includes iteratively applying individual layers of a powder bed material to a powder bed, wherein the powder bed material includes polymer particles and a redox-active inorganic salt mixed with the polymer particles. A fusing agent is selectively jetted onto the individual layers of powder bed material based on a three-dimensional object model. The fusing agent includes water and an electromagnetic radiation absorber. The electromagnetic radiation absorber absorbs electromagnetic radiation energy and converts the electromagnetic radiation energy to heat. The powder bed is exposed to electromagnetic radiation energy to selectively fuse the polymer particles in contact with the electromagnetic radiation absorber at individual layers, thereby forming the three-dimensional printed object. In some examples, the methods can include making the powder bed material by dry mixing the polymer particles with the redox-active inorganic salt. In further examples, the redox-active inorganic salt can be reactive with a target metal cation to form a water-insoluble colored pigment, and the method can also include exposing the three-dimensional printed object to an aqueous solution of the target metal cation to form the water-insoluble colored pigment. In certain examples, the target metal cation can be $Fe^{2+}$, $Fe^{3+}$, $Zn^{2+}$, $Cu^{2+}$, or $Ba^{2+}$ and the water-insoluble colored pigment can be iron oxide red, barium white, basic copper carbonate, zinc chrome yellow, or Prussian blue. In particular examples, the redox-active inorganic salt can be $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$. In other examples, the fusing agent can be a colorless fusing agent or a low tint fusing agent.

The present disclosure also extends to systems for three-dimensional printing. In one example, a system for three-dimensional printing includes a powder bed material, a fusing agent to selectively apply to a layer of the powder bed material, and a radiant energy source positioned to expose the layer of powder bed material to electromagnetic radiation energy. The powder bed material includes polymer particles and a redox-active inorganic salt mixed with the polymer particles. The fusing agent includes water and an electromagnetic radiation absorber. The electromagnetic radiation absorber absorbs electromagnetic radiation energy and converts the electromagnetic radiation energy to heat. Exposing the layer of powder bed material to electromagnetic radiation energy selectively fuses the polymer particles in contact with the electromagnetic radiation absorber and thereby forms a three-dimensional printed object. In some examples, the redox-active inorganic salt can be $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$. In further examples, the redox-active inorganic salt can be present in the powder bed material in an amount from about 0.1 wt % to about 5 wt % and wherein the powder bed material further includes titanium dioxide in an amount from about 1 wt % to about 5 wt %.

It is noted that when discussing the three-dimensional printing kits, methods, and systems herein, these discussions can be considered applicable to one another whether or not they are explicitly discussed in the context of that example. Thus, for example, when discussing a fusing agent related to a three-dimensional printing kit, such disclosure is also relevant to and directly supported in the context of methods and systems, vice versa, etc.

It is also understood that terms used herein will take on their ordinary meaning in the relevant technical field unless specified otherwise. In some instances, there are terms defined more specifically throughout the specification or included at the end of the present specification, and thus, these terms have a meaning as described herein.

Three-Dimensional Printing Kits

As explained above, the three-dimensional printing kits, methods, and systems described herein can be used to make three-dimensional printed objects that can detect the presence of certain metal cations. The three-dimensional printed objects can change color upon exposure to the target metal cation, providing a simple way to test for the target metal cation. The three-dimensional printing processes described herein can produce a wide variety of custom-shaped three-dimensional printed sensors that can be incorporated into a variety of systems or processes where metal ion sensing is desired. The three-dimensional printed sensors can also be reproduced cheaply, so that the three-dimensional printed sensor can be replaceable in some examples. Detecting metal ions can be useful in many applications, such as detecting corrosion of metal equipment, monitoring of content of machine lubricants such as motor oil, water quality monitoring, and so on.

The three-dimensional printing processes described herein can include applying a fusing agent to a powder bed material that includes polymer particles. As mentioned above, a redox-active inorganic salt can be mixed with the polymer particles. The fusing agent can include a radiation absorber, which can be a compound or material that absorbs electromagnetic radiation energy (such as UV or infrared radiation) and converts the energy to heat. After applying the fusing agent, a radiation source is used to irradiate the powder bed. The areas of the powder bed where the fusing agent was applied can be selectively heated to a melting or softening point temperature of the polymer particles so that the polymer particles fuse together to form a solid layer of the final three-dimensional printed object.

The final three-dimensional printed object can be made up of multiple layers of fused polymer particles. The redox-active inorganic salt can become locked in the solid polymer matrix when the polymer particles fuse together. Thus, redox-active inorganic salt can be distributed throughout the final three-dimensional printed object. When the three-dimensional printed object contacts the target metal cation, the target metal cation can react with the redox-active inorganic salt to form a colored pigment. The appearance of the colored pigment can indicate that the target metal cation is present.

One example of this reaction is the formation of "Prussian blue" pigment. In one example, the redox-active inorganic salt that is mixed in the powder bed material can be $K_3[Fe(CN)_6]$. This salt can react with iron(II) ions to form a blue pigment. Therefore, if a three-dimensional printed object is formed from this powder bed material and then placed in an aqueous solution including iron ions, for example, then the iron ions can react with the inorganic salt to cause the surface of the three-dimensional printed object to turn blue. The same pigment can also be formed by the reaction of $K_4[Fe(CN)_6]$ with iron(III) ions in other examples. Therefore, the powder bed material can include $K_4[Fe(CN)_6]$ if the target metal cation is iron(III).

With this description in mind, FIG. 1 shows a schematic of an example three-dimensional printing kit 100. The kit includes a powder bed material 110 and a fusing agent 120 to selectively apply to the powder bed material. The powder bed material can include polymer particles and a redox-active inorganic salt mixed with the polymer particles. The fusing agent can include water and an electromagnetic radiation absorber. The electromagnetic radiation absorber can absorb electromagnetic radiation energy and convert the electromagnetic radiation energy to heat.

As used herein, "redox-active inorganic salt" refers to inorganic salts that can react with metal ions by transferring an electron or multiple electrons (i.e., an oxidation-reduction reaction). The redox-active inorganic salts used in the powder bed material described herein can react with metal cations to form water-insoluble colored pigments. In some examples, the target metal cation can be $Fe^{2+}$, $Fe^{3+}$, $Zn^{2+}$, $Cu^{2+}$, or $Ba^{2+}$. Non-limiting examples of inorganic salts that can react with these metal cations can include $K_2CrO_4$, $Na_2CrO_4$, $NaHCO_3$, $Na_2CO_3$, $Na_2SO_4$, $NaOH$, $K_4[Fe(CN)_6]$, and $K_3[Fe(CN)_6]$. In further examples, the water-insoluble colored pigment can be iron oxide red, barium white, basic copper carbonate, zinc chrome yellow, or Prussian blue.

As used herein, "water-soluble" refers to materials that can be dissolved in water at a concentration from about 5 wt % to about 99 wt % of the dissolved material with respect to the entire weight of the solution. The solution of a water-soluble material can be fully transparent without any phase separation. Materials that are not water-soluble can be referred to as "water-insoluble."

In further examples, the three-dimensional printing kits can further include other fluids, such as coloring agents, detailing agents, or the like. A detailing agent, for example, can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused. The compositions of the fluid agents and powder bed materials are described in more detail below.

Methods of Making Three-Dimensional Printed Objects

Figure 2:
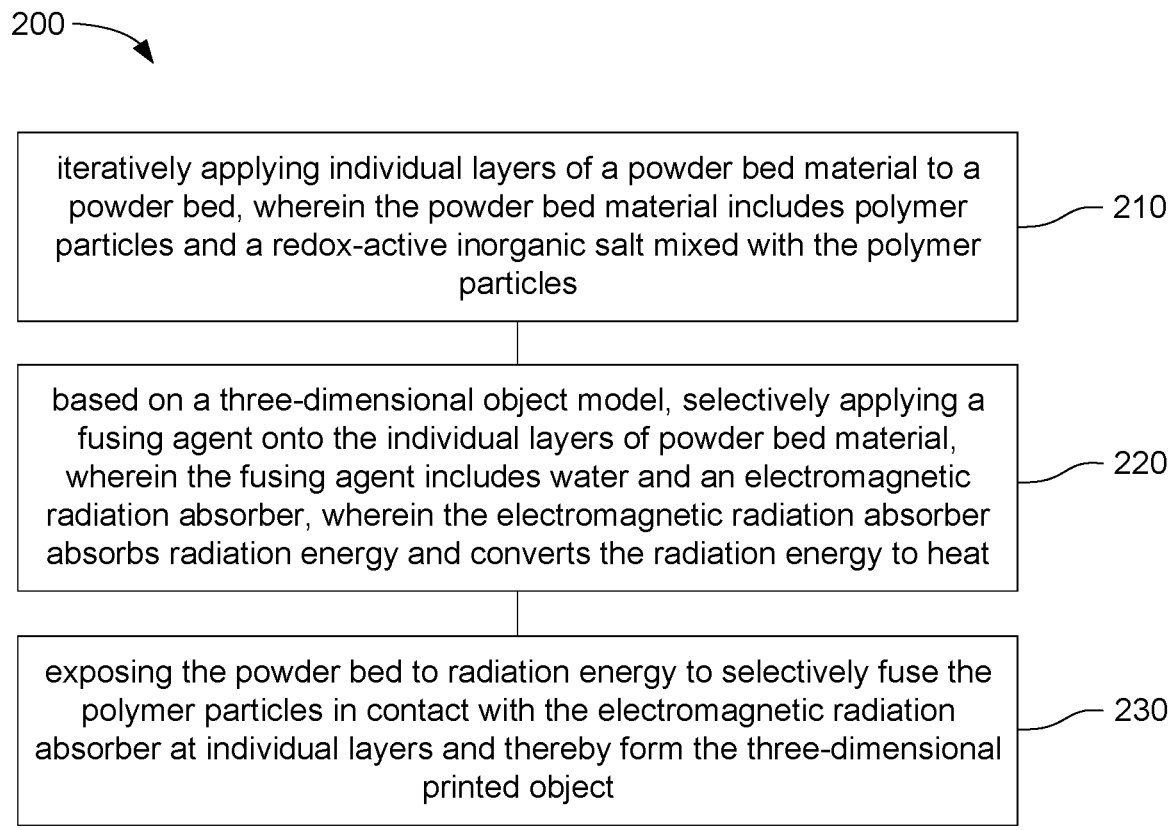
FIG. 2 a flowchart illustrating an example method of making a three-dimensional printed object in accordance with examples of the present disclosure.

The present disclosure also describes methods of making three-dimensional printed objects. The materials described above in the three-dimensional printing kits can be used in these methods. FIG. 2 shows a flowchart illustrating one example method 200 of making a three-dimensional printed object. The method can include iteratively applying 210 individual layers of a powder bed material to a powder bed, wherein the powder bed material includes polymer particles and a redox-active inorganic salt mixed with the polymer particles; and based on a three-dimensional object model, selectively applying 220 a fusing agent onto the individual layers of powder bed material, wherein the fusing agent includes water and an electromagnetic radiation absorber, wherein the electromagnetic radiation absorber absorbs electromagnetic radiation energy and converts the electromagnetic radiation energy to heat. The method can further include exposing 230 the powder bed to electromagnetic radiation energy to selectively fuse the polymer particles in contact with the electromagnetic radiation absorber at individual layers and thereby form the three-dimensional printed object.

Figure 3A:
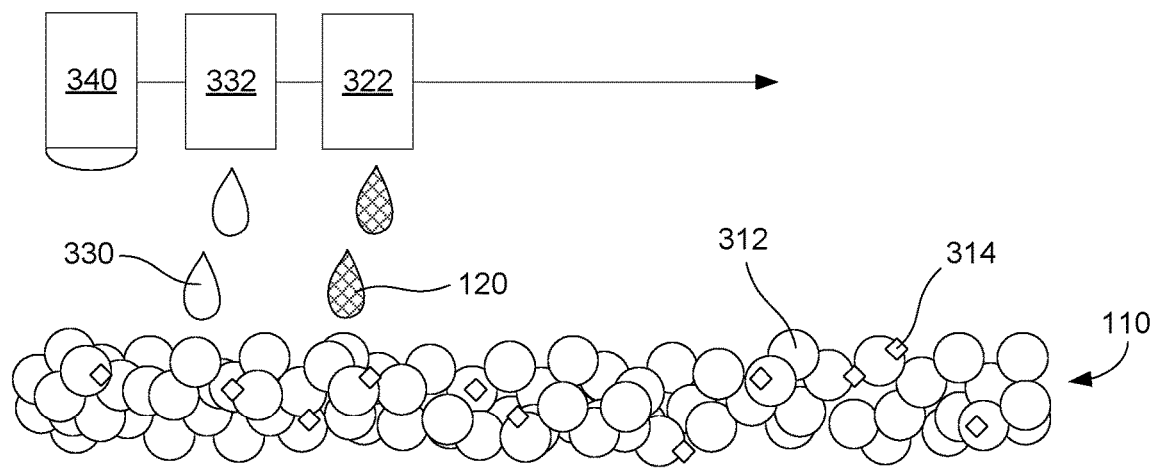
FIGS. 3A-3C show a schematic view of an example method of making a three-dimensional printed object in accordance with examples of the present disclosure.
Figure 3B:
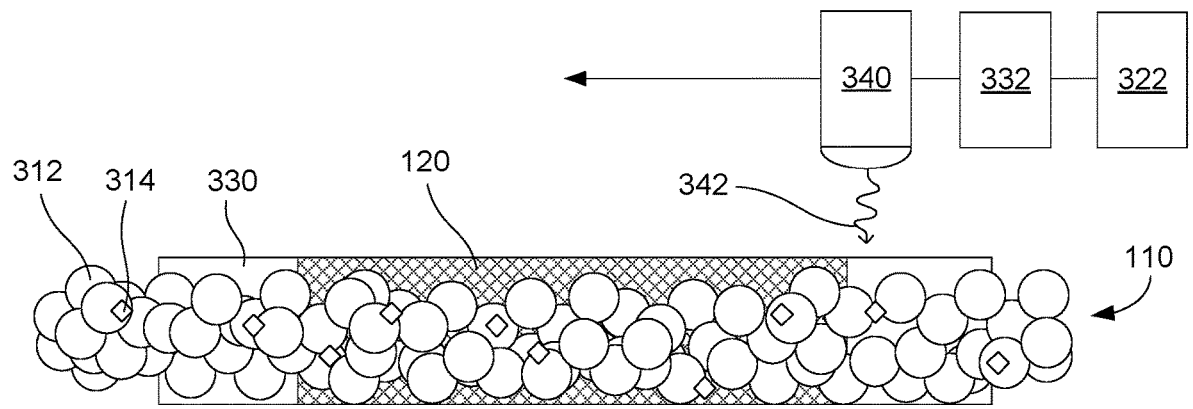
Figure 3C:
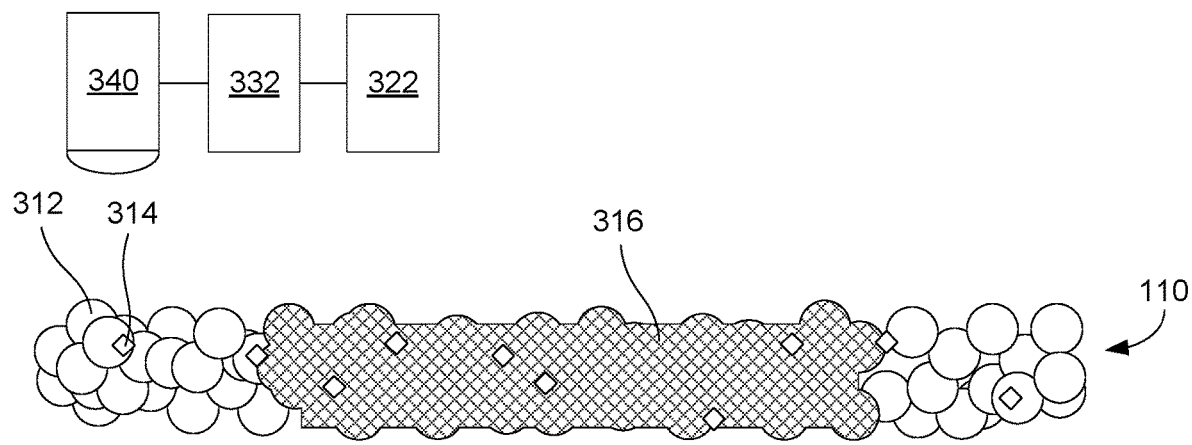

To further illustrate methods of making three-dimensional printed object set forth above, as well as the three-dimensional printing systems described in further detail below, FIGS. 3A-3C show an example preparation of a three-dimensional printed object using the three-dimensional printing kits described above. Reference numerals used in FIGS. 3A-3C are shown in one or multiple locations, but may be described once or multiple times in various instances to provide clarity.

In FIG. 3A, a fusing agent 120 is jetted onto a layer of powder bed material 110 made up of polymer particles 312 and redox-active inorganic salt 314. The fusing agent is jetted from a fusing agent ejector 322. The fusing agent ejector can move across the layer of powder bed material to selectively jet the fusing agent on areas that are to be fused. In this specific example, a detailing agent 330 can also be jetted onto the powder bed from a detailing agent ejector 332. The detailing agent can be jetted around borders of the area where the fusing agent is jetted. The detailing agent can cool the powder bed material around the borders of the fused layers to provide a sharp transition between fused and unfused polymer particles. In some examples, the detailing agent can likewise be jetted within a body of the three-dimensional object being formed if there is a benefit to introducing additional cooling within a bulk of the three-dimensional object during the build. A radiation source 340 can also be included to introduce electromagnetic radiation energy to the powder bed, and can be included at a static position, or can be movable, e.g., move across the layer of powder bed material.

FIG. 3B shows the layer of powder bed material 110 after the fusing agent 120 and detailing agent 330 have been jetted onto the powder bed. The fusing agent has been jetted in an area of the polymer powder layer that is to be fused. The detailing agent has been jetted around the borders of this area. In this figure, the radiation source 340 is shown emitting radiation 342 toward the layer of powder bed material. The fusing agent can include a radiation absorber that can absorb this radiation and convert the electromagnetic radiation energy to heat.

FIG. 3C shows the layer of powder bed material 110 with a fused portion 316 where the fusing agent was jetted. This portion has reached a sufficient temperature to fuse the polymer particles together to form a solid polymer matrix. The surround powder bed material, where the detailing agent was jetted, remains as loose separate particles. The process shown in FIGS. 3A-3C can be repeated with additional layers of powder bed material to build up a three-dimensional printed object layer by layer.

As mentioned above, in some examples a detailing agent can be used with the fusing agent. The detailing agent can be a fluid that reduces the maximum temperature of the polymer powder on which the detailing agent is printed. In particular, the maximum temperature reached by the powder during exposure to electromagnetic radiation energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas The fusing agent and detailing agent can be jetted onto the powder bed using fluid jet print heads. The amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be polyamide 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The three-dimensional printed object can be formed by jetting a fusing agent onto layers of powder bed build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. In certain examples, the three-dimensional object model can define the three-dimensional shape of the object and the three-dimensional shape of areas of the powder bed to be jetted with detailing agent. In other examples, the object can be defined by a first three-dimensional object model a second three-dimensional object model can define areas to jet the detailing agent. In further examples, the jetting of the detailing agent may not be controlled using a three-dimensional object model, but using some other parameters or instructions to the three-dimensional printing system. Other information may also be included in three-dimensional object models, such as structures to be formed of additional different materials or color data for printing the object with various colors at different locations on the object. The three-dimensional object model may also include features or materials specifically related to jetting fluids on layers of powder bed material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of build material.

In an example of the three-dimensional printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual layers of a powder bed material to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic radiation energy, e.g., typically the entire bed. The electromagnetic radiation energy can include light, infrared radiation, and so on. The radiation absorber can absorb more energy from the electromagnetic radiation energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete three-dimensional object is printed. Thus, "applying individual build material layers of polymer particles to a powder bed" also includes spreading layers of polymer particles over the loose particles and fused layers beneath the new layer of polymer particles.

Systems for Three-Dimensional Printing

Figure 4:
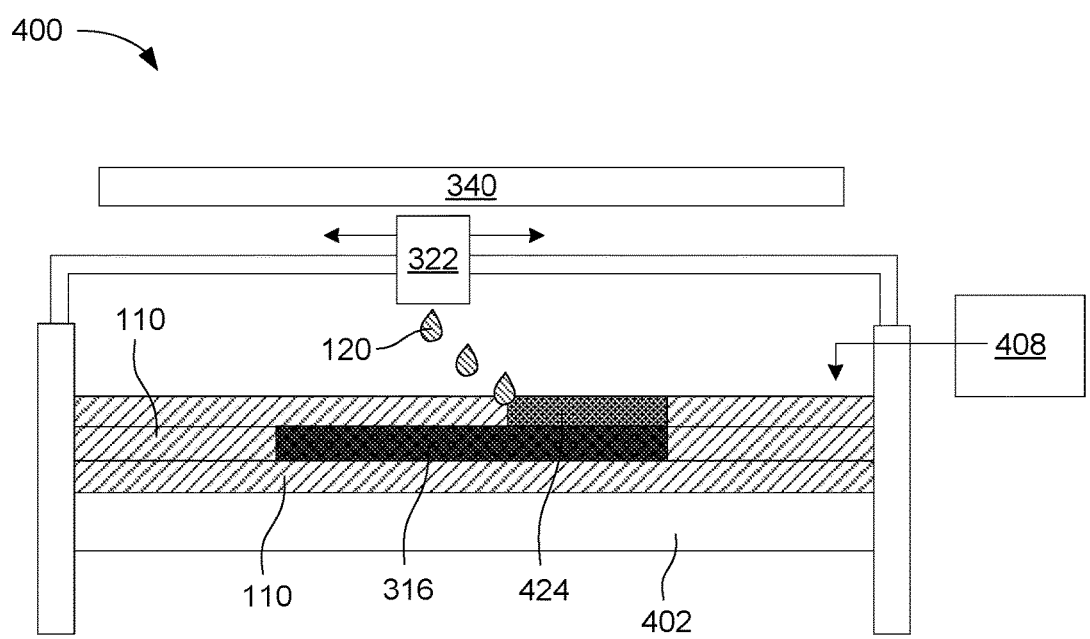
FIG. 4 is a schematic view of an example system for three-dimensional printing in accordance with examples of the present disclosure.

The present disclosure also extends to systems for three-dimensional printing. Portions of the system of three-dimensional printing are shown and described in connection with FIGS. 3A-3C above, and in further detail in FIG. 4 at 400. The system can include, for example, the powder bed material 110 and the fusing agent 120 described previously. The systems can also include a radiant energy source 340 positioned to expose the powder bed material to electromagnetic radiation energy to selectively fuse the polymer particles in contact with the radiation absorber from the fusing agent. In some examples, the powder bed material can be distributed in individual layers by a build material applicator, and the fusing agent can be jetted onto the layers by a fluid ejector. FIG. 4 shows an example system 400 for three-dimensional printing in accordance with the present disclosure. The system includes a build platform 402. Powder bed material 110 can be deposited onto the build platform by a build material applicator 408 where the powder bed material can be flattened or smoothed, such as by a mechanical roller or other flattening technique. This can form a flat layer of powder bed material. The fusing agent 120 can then be applied to the layer by a fusing agent ejector 322. The area 424 where the fusing agent is applied can correspond to a layer or slice of a three-dimensional object model. The system can include a radiant energy source 340 that can be used to apply electromagnetic energy to generate heat at the layers of powder bed material where the fusing agent has been applied. In this particular example, the system includes a radiant energy source that can irradiate the entire powder bed at once instead of a moveable radiant energy source that moves across the powder bed. The radiant energy source can heat the powder bed material and fusing agent until the powder bed material on which the fusing agent was printed reaches a melting or softening point temperature of the powder bed material. The polymer particles can fuse together to form a solid polymer matrix 316. In this figure, one layer of solid polymer matrix has already been formed and then a layer of additional powder bed material has been spread over the top of the solid layer. The figure shows the fusing agent being applied to the additional layer, which can then subsequently be heated and fused to add another solid layer to the three-dimensional printed object.

As used herein, "applying individual layers of powder bed material to a powder bed" can include applying the first layer of powder bed material that is applied directly to an empty support bed. The "support bed" can refer to the build platform, as shown in FIG. 4, for example. Additionally, in some examples, a layer or multiple layers of powder bed material can be laid on the support bed without jetting any fusing agent onto the layers. This can provide a more thermally uniform temperature profile for the first layer to have the fusing agent jetted thereon. Accordingly, "applying individual layers of a powder bed material to a powder bed" can include applying a layer of powder bed material onto the initial layer or layers that may be applied without any fusing agent. The phrase "applying individual layers of a powder bed material to a powder bed" also includes applying to subsequent layers, when a layer or slice of the three-dimensional printed object has already been formed in the layer below.

In further examples, the system can include a radiant energy source. The radiant energy source can be positioned above the powder bed material as in FIG. 4, or in other examples the heater can be on a side or sides of the powder bed material, or a combination of these locations. In some examples, the support bed can include an additional integrated heater to heat the powder bed material from below to maintain a more uniform temperature in the powder bed. The radiant energy source can be used to heat the areas of the powder bed where fusing agent has been applied to fuse the polymer particles in those areas. In certain examples, the radiant energy source heater can include a heat lamp, infrared heater, halogen lamp, fluorescent lamp, or other type of radiant energy source. In further examples, the radiant energy source can be mounted on a carriage to move across the powder bed. In certain examples, the fusing agent ejector and the radiant energy source can both be mounted on a carriage to move across the powder bed. For example, the fusing agent can be jetted from the fusing agent ejector on a forward pass of the carriage, and the radiant energy source can be activated to irradiate the powder bed on a return pass of the carriage. A coloring agent ejector and any other fluid ejectors in the system can also be mounted on the carriage.

Powder Bed Material

The powder bed material can include polymer particles having a variety of shapes, such as substantially spherical particles or irregularly-shaped particles. In some examples, the polymer powder can be capable of being formed into three-dimensional printed objects with a resolution of about 20 μm to about 100 μm, about 30 μm to about 90 μm, or about 40 μm to about 80 μm. As used herein, "resolution" refers to the size of the smallest feature that can be formed on a three-dimensional printed object. The polymer powder can form layers from about 20 μm to about 100 μm thick, allowing the fused layers of the printed part to have roughly the same thickness. This can provide a resolution in the z-axis (i.e., depth) direction of about 20 μm to about 100 μm. The polymer powder can also have a sufficiently small particle size and sufficiently regular particle shape to provide about 20 μm to about 100 μm resolution along the x-axis and y-axis (i.e., the axes parallel to the top surface of the powder bed). For example, the polymer powder can have an average particle size from about 20 μm to about 100 μm. In other examples, the average particle size can be from about 20 μm to about 50 μm. Other resolutions along these axes can be from about 30 μm to about 90 μm or from about 40 μm to about 80 μm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6,6 powder, polyamide 612, thermoplastic polyamide, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

As mentioned above, the powder bed material can include a redox-active inorganic salt mixed with the polymer particles. The redox-active inorganic salt can be reactive with a target metal cation to form a colored pigment. A variety of colored pigments can be formed in this way, depending on the redox-active inorganic salt and target metal cation that are used. In certain examples, the reaction forming the colored pigment can involve two reactants (i.e., the redox-active inorganic pigment and the target metal cation). In other examples, the reaction can involve additional reactants. Therefore, in some examples the powder bed material can include the redox-active inorganic salt and an additional reactant. In some examples, the additional reactant can participate actively in the reaction, or create a favorable pH level for the reaction to occur, or both.

In some examples, the redox-active inorganic salt can be water soluble. The target metal cation can also be water soluble. However, in some examples the colored pigment that is formed by reacting these reactants can be water insoluble.

In further examples, the redox-active inorganic salt can be a metal salt. In certain examples, the redox-active inorganic salt can include $K_2CrO_4$, $Na_2CrO_4$, $NaHCO_3$, $Na_2CO_3$, $Na_2SO_4$, $NaOH$, $K_4[Fe(CN)_6]$, or $K_3[Fe(CN)_6]$. In certain further examples, these salts can be reactive with target metal cations such as $Fe^{2+}$, $Fe^{3+}$, $Zn^{2+}$, $Cu^{2+}$, or $Ba^{2+}$.

In some examples, the colored pigment formed by the reaction of the redox-active inorganic salt and the target metal cation can be Prussian blue. Prussian blue is an oxidation product of ferrous ferrocyanide salt. Specifically, Prussian blue has the chemical formula $KFe[Fe(CN)_6]_{(s)}$. Prussian blue can be formed using the following reaction:

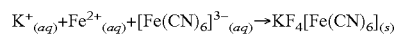

In other examples, Prussian blue can also be formed using the following reaction:

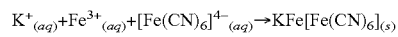

In a specific example, Prussian blue can be formed by including $K_3[Fe(CN)_6]$ in the powder bed material as the redox-active inorganic salt, and then exposing the three-dimensional printed object made from the powder bed material to a fluid containing iron ions.

In another example, the colored pigment can be iron oxide red. Iron oxide red has the chemical formula $Fe_2O_3$. This pigment can be formed using the following reaction:

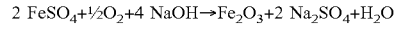

Therefore, in some examples the redox-active inorganic salt can be NaOH and the target metal cation can be an iron ion.

In yet another example, the colored pigment can be barium white. The chemical formula of barium white is $BaSO_4$. This pigment can be made by the following reaction:

$$BaCl_2 + Na_2SO_4 \rightarrow BaSO_4 + 2\ NaCl$$

Therefore, in some examples, the redox-active inorganic salt can be $Na_2SO_4$ and the target metal cation can be a barium ion.

In another example, the colored pigment can be basic copper carbonate. Basic copper carbonate has the chemical formula $Cu_2(OH)_2CO_3$. This pigment can be formed using the following reaction:

$$2\ CuSO_4 + 2\ Na_2CO_3 + H_2O \rightarrow Cu_2(OH)_2CO_3 + 2\ Na_2SO_4 + CO_2$$

Therefore, in some examples, the redox-active inorganic salt can be $Na_2CO_3$ and the target metal cation can be a copper ion. In another example, basic copper carbonate can be formed using the following reaction:

$$2\ CuSO_4 + 4\ NaHCO_3 \rightarrow Cu_2(OH)_2CO_3 + 2\ Na_2SO_4 + 3\ CO_2 + H_2O$$

Therefore, in other examples, the redox-active inorganic salt can be $NaHCO_3$ and the target metal cation can be a copper ion.

In still another example, the colored pigment can be zinc chrome yellow. Zinc chrome yellow has the chemical formula $ZnCrO_4$ and can be formed using the following reaction:

$$K_2CrO_4 + ZnSO_4 \rightarrow ZnCrO_4 + K_2SO_4$$

Therefore, in some examples, the redox-active inorganic salt can be $K_2CrO_4$ and the target metal cation can be a zinc ion.

In further examples, the colored pigment can be any pigment that is formable by combining a redox-active inorganic salt with a metal ion. The redox-active inorganic salt can be formulated into the powder bed material as described above and the three-dimensional printed object formed from the powder bed material can be used to detect the presence of the target metal ion.

The amount of redox-active inorganic salt in the powder bed material can be selected to provide a desired color intensity of the colored pigment formed when the redox-active inorganic salt reacts with the target metal cation. In some examples, the redox-active inorganic salt can be present in an amount from about 0.05 wt % to about 5 wt %, or from about 0.1 wt % to about 4 wt %, or from about 0.5 wt % to about 3 wt %, with respect to the total weight of the powder bed material.

The powder bed material can also in some cases include a filler.

The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1. In some examples, the powder bed material can include titanium dioxide to provide a white color to the powder bed material. The titanium dioxide can be present in an amount from about 1 wt % to about 5 wt %, or from about 1 wt % to about 4 wt %, or from about 1.5 wt % to about 3 wt %, with respect to the total weight of the powder bed material.

Fusing Agents

The three-dimensional printing kits described herein can include a fusing agent to be applied to the powder bed build material. The fusing agent can include a radiation absorber that can absorb electromagnetic radiation energy and convert the energy to heat. In some examples, the fusing agent can be a low-tint fusing agent. Low-tint fusing agents can be colorless or have a faint color, so that when the low-tint fusing agent is used during the three-dimensional printing process, the final three-dimensional printed object can be colorless or have a faint color. In certain examples, the low-tint fusing agent can impart a light gray or light blue color to the three-dimensional printed object. If the low-tint fusing agent imparts a color to the three-dimensional printed object, then the color can be less intense than when a black fusing agent is used. Black fusing agents can also be used, which can include a black pigment as a radiation absorber. However, such black fusing agents can produce black or dark gray colored three-dimensional printed objects. Having such a dark color can make it more difficult to visually detect the colored pigment that forms from the reaction of the redox-active salt and the target metal cation. Therefore, in some examples, the three-dimensional printed object can be made using a low-tint or colorless fusing agent. In further examples, a low-tint fusing agent and a black fusing agent can both be used together. For example, a black fusing agent can be used to print a core portion of the three-dimensional printed object. An outer layer of the three-dimensional printed object can be formed using the low-tint fusing agent. In this way, the object can have the appearance of being made with the low-tint fusing agent, but a significant portion of the interior volume of the object can actually be made using the black fusing agent. The outer layer of the object can be white or have a light color from the low-tint fusing agent. The colored pigment that is formed when the redox-active inorganic salt reacts with the target metal cation can be easily visible on the white or light colored surface of the three-dimensional printed object.

As mentioned, the electromagnetic radiation absorber can absorb and convert electromagnetic radiation energy to thermal energy. In one example, a low-tint fusing agent can include an electromagnetic radiation absorber that can absorb electromagnetic radiation energy at a wavelength from about 800 nm to about 4,000 nm. As used herein, "absorb" means that 80% or more of the radiation having wavelengths from about 800 nm to about 4,000 nm is absorbed. When used with a light source that emits a wavelength in this range the electromagnetic radiation absorber can cause a polymeric powder bed material in contact therewith to melt and coalesce without melting the polymeric powder bed material that is not in contact with the low tint fusing agent. In accordance with the "low tint" aspect of the low tint fusing agent, the electromagnetic radiation absorber can be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic radiation energy wavelengths from 800 nm to 4,000 nm sufficient to partially or fully melt or coalesce the polymeric powder bed material that is in contact with the low tint fusing agent.

In some examples, the electromagnetic radiation absorber of the low tint fusing agent can include an inorganic pigment. The inorganic pigment can include lanthanum hexaborides, tungsten bronzes, indium tin oxides, aluminum zinc oxides, ruthenium oxides, silver, gold, platinum, iron pyroxenes, iron phosphates, copper pyrophosphates, or a combination thereof. In an example, the electromagnetic radiation absorber can include a tungsten bronze. The tungsten bronze can be an alkali doped tungsten oxide. The alkali dopant can be included from greater than 0 mol % to about 0.33 mol % cesium, sodium, potassium, rubidium, or a combination thereof. In another example, the electromagnetic radiation absorber can include a modified iron phosphate having a formula $A_xFe_yPO_4$. In an example, the modified iron phosphate can include copper iron phosphate where A is Cu, magnesium iron phosphate where A is Mg, or zinc iron phosphate where A is Zn. In the copper iron phosphate, the magnesium iron phosphate, or the zinc iron phosphate x is 0.1 to 0.5 and y is 0.50 to 0.9. In a further example, the electromagnetic radiation absorber can be a modified copper phosphate having a formula $A_xCu_yP_2O_7$. The modified copper phosphate can include iron copper phosphate where A is Fe, magnesium copper phosphate where A is Mg, or zinc copper phosphate where A is Zn. In the iron copper phosphate, the magnesium copper phosphate, or the zinc copper phosphate x is 0 to 2 and y is 0 to 2.

The electromagnetic radiation absorber can be present in the fusing agent at from about 1 wt % to about 20 wt %. In other examples, the electromagnetic radiation absorber can be present at from about 1 wt % to about 10 wt %, at from about 5 wt % to about 15 wt %, at from 10 wt % to about 20 wt %, or from about 2 wt % to about 12 wt %. Furthermore, the electromagnetic radiation absorber can have an average particle size that can range from about 1 nm to about 250 nm. The term "average particle size" describes a diameter or average diameter, which may vary, depending upon the morphology of the individual particle. In an example, the respective particle can have a substantially spherical morphology. A substantially spherical particle, e.g., spherical or near-spherical) has a sphericity of >0.84. Thus, any individual particles having a sphericity of <0.84 are considered non-spherical (irregularly shaped). The particle size of the substantially spherical particle may be provided by its diameter, and the particle size of a non-spherical particle may be provided by its average diameter, e.g., the average of multiple dimensions across the particle, or by an effective diameter, e.g. the diameter of a sphere with the same mass and density as the non-spherical particle. In yet other examples, the electromagnetic radiation absorber can have an average particle size from about 10 nm to about 200 nm, from about 5 nm to about 75 nm, from about 50 nm to about 150 nm, or from about 80 nm to about 160 nm.

As mentioned above, in some examples the three-dimensional printing kits, methods, and systems described herein can include a low-tint fusing agent, or a combination of a low-tint fusing agent and an additional fusing agent.

The fusing agents can include a radiation absorber that can absorb electromagnetic radiation energy and convert the energy to heat. In certain examples, the fusing agent can be used with a powder bed material in a particular three-dimensional printing process. A thin layer of powder bed material can be formed, and then the fusing agent can be selectively applied to areas of the powder bed material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final three-dimensional printed object. After applying the fusing agent, the powder bed material can be irradiated with electromagnetic radiation energy. The radiation absorber from the fusing agent can absorb this energy and convert it to heat, thereby heating any polymer particles in contact with the radiation absorber. An appropriate amount of electromagnetic radiation energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of electromagnetic radiation energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. The print mode can include any variables or parameters that can be controlled during three-dimensional printing to affect the outcome of the three-dimensional printing process.

The process of forming a single layer by applying fusing agent and irradiating the powder bed can be repeated with additional layers of fresh powder bed material to form additional layers of the three-dimensional printed object, thereby building up the final object one layer at a time. In this process, the powder bed material surrounding the three-dimensional printed object can act as a support material for the object. When the three-dimensional printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R. T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

The ingredients listed above can be included in a low-tint fusing agent in some examples. In further examples, the ingredients listed above can be included in an additional fusing agent or agents, such as black fusing agents.

Detailing Agents

In further examples, the three-dimensional printing kits, methods, and systems can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or higher. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % to 100 wt %, or from 85 wt % to 99 wt % water. In further examples, the detailing agent can be about 95 wt % to 100 wt % water, or from 95 wt % to 99 wt %. In still further examples, the detailing agent can be substantially devoid of radiation absorbers. That is, in some examples, the detailing agent can be substantially devoid of ingredients that absorb enough electromagnetic radiation energy to cause the powder to fuse. In certain examples, the detailing agent can include colorants such as dyes or pigments, but in small enough amounts that the colorants do not cause the powder printed with the detailing agent to fuse when exposed to the electromagnetic radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" can include pigment colorants, magnetic particles, aluminas, silicas, and/or other ceramics, organo-metallics or other opaque particles, whether or not such particulates impart color. Thus, though the present description mentions pigment colorants, the term "pigment" can be used to describe pigment colorants and also other pigments such as organometallics, ferrites, ceramics, etc. In one specific aspect, however, the pigment is a pigment colorant. A "pigment reactant" on the other hand is not a pigment per se, but rather a component that reacts with another "pigment reactant" to form a pigment.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure.

However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1

A powder bed material was made by dry blending $K_3[Fe(CN)_6]$ with a polyamide 12 powder that included a small amount of $TiO_2$ to increase the whiteness of the powder. The amount of $K_3[Fe(CN)_6]$ was 1 wt % with respect to the total weight of the powder bed material. The ingredients were dry blended using a Resodyn™ acoustic mixer (Resodyn Corporation, USA).

The powder bed material was loaded into an HP Multi-jet Fusion 3D® test printer and a three-dimensional printed object was formed using the test printer. The fusing agent used in the three-dimensional printing process was a low-tint fusing agent that gave the three-dimensional printed part a light blue tint.

For comparison, the same powder bed material was used in an injection molding machine to make an injection molded object. The powder was melted and then injected into a mold at a pressure of 700 bar. The mold was held at a temperature of 50° C. The injection molded object had the same shape and size as the three-dimensional printed object.

The injection molded object and the three-dimensional printed object were both dipped in an aqueous solution of 1 wt % $FeSO_4$, which was a source of iron(II) cations. The injection molded object did not change color. However, the three-dimensional printed object developed a dark blue color when dipped in the solution.

For comparison, a second three-dimensional printed object was printed and dipped in deionized water. The three-dimensional printed object that was dipped in deionized water did not change color.

From these results, it can be seen that the three-dimensional printed object with the redox-active inorganic salt is able to detect the presence of the target metal cation. The three-dimensional printed object appears to detect the target cation much better than an injection molded object made using the same powder bed material. This is likely due to the higher surface area and higher permeability of the surface of the three-dimensional printed object compared to the injection molded object. The three-dimensional printed object can allow more of the iron solution to contact more of the redox-active inorganic salt within the three-dimensional printed part.

What is claimed is:

1. A three-dimensional printing kit comprising:
a powder bed material consisting of:
polymer particles selected from the group consisting of polyamide 6 powder, polyamide 9 powder, polyamide 11 powder, polyamide 12 powder, polyamide 6,6 powder, polyamide 612 powder, thermoplastic polyamide powder, a polyamide copolymer powder, polyethylene powder, thermoplastic polyurethane powder, acrylonitrile butadiene styrene powder, polypropylene powder, polyester powder, polycarbonate powder, a polycarbonate and acrylonitrile butadiene styrene copolymer powder, a polycarbonate and polyethylene terephthalate polyether ketone copolymer powder, polystyrene powder, and mixtures thereof;
an optional inorganic filler selected from the group consisting of alumina, silica, titanium dioxide, and carbon nanotubes; and
a redox-active inorganic salt mixed with the polymer particles; and
a fusing agent to selectively apply to the powder bed material, the fusing agent comprising water and an electromagnetic radiation absorber, wherein the electromagnetic radiation absorber absorbs electromagnetic radiation energy and converts the electromagnetic radiation energy to heat.

2. The three-dimensional printing kit of claim 1, wherein the redox-active inorganic salt is reactive with a target metal cation to form a water-insoluble colored pigment, and wherein the target metal cation is $Fe^{2+}$, $Fe^{3+}$, $Zn^{2+}$, $Cu^{2+}$, or $Ba^{2+}$.

3. The three-dimensional printing kit of claim 1, wherein the redox-active inorganic salt is $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$.

4. The three-dimensional printing kit of claim 1, wherein the redox-active inorganic salt is present in the powder bed material in an amount ranging from about 0.05 wt % to about 5 wt %, with respect to a total weight of the powder bed material.

5. The three-dimensional printing kit of claim 1, wherein the titanium dioxide is present in the powder bed material in an amount ranging from about 1 wt % to about 5 wt %, with respect to a total weight of the powder bed material.

6. The three-dimensional printing kit of claim 1, wherein the fusing agent is a colorless fusing agent or a low tint fusing agent.

7. A method of making a three-dimensional printed object comprising:
   iteratively applying individual layers of a powder bed material to a powder bed, wherein the powder bed material consists of:
      polymer particles selected from the group consisting of polyamide 6 powder, polyamide 9 powder, polyamide 11 powder, polyamide 12 powder, polyamide 6,6 powder, polyamide 612 powder, thermoplastic polyamide powder, a polyamide copolymer powder, polyethylene powder, thermoplastic polyurethane powder, acrylonitrile butadiene styrene powder, polypropylene powder, polyester powder, polycarbonate powder, a polycarbonate and acrylonitrile butadiene styrene copolymer powder, a polycarbonate and polyethylene terephthalate polyether ketone copolymer powder, polystyrene powder, and mixtures thereof;
      an optional inorganic filler selected from the group consisting of alumina, silica, titanium dioxide, and carbon nanotubes; and
      a redox-active inorganic salt mixed with the polymer particles;
   based on a three-dimensional object model, selectively applying a fusing agent onto the individual layers of powder bed material, wherein the fusing agent comprises water and an electromagnetic radiation absorber, and wherein the electromagnetic radiation absorber absorbs electromagnetic radiation energy and converts the electromagnetic radiation energy to heat; and
   exposing the powder bed to electromagnetic radiation energy to selectively fuse the polymer particles in contact with the electromagnetic radiation absorber at individual layers and thereby form the three-dimensional printed object.

8. The method of claim 7, further comprising making the powder bed material by dry mixing the polymer particles with the redox-active inorganic salt.

9. The method of claim 7, wherein the redox-active inorganic salt is reactive with a target metal cation to form a water-insoluble colored pigment, and wherein the method further comprises exposing the three-dimensional printed object to an aqueous solution of the target metal cation to form the water-insoluble colored pigment.

10. The method of claim 9, wherein the target metal cation is $Fe^{2+}+Fe^{3+}$, $Zn^{2+}$, $Cu^{2+}$, or $Ba^{2+}$ and the water-insoluble colored pigment is iron oxide red, barium white, basic copper carbonate, zinc chrome yellow, or Prussian blue.

11. The method of claim 7, wherein the redox-active inorganic salt is $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$.

12. The method of claim 7, wherein the fusing agent is a colorless fusing agent or a low tint fusing agent.

13. A system for three-dimensional printing comprising:
   a powder bed material consisting of:
      polymer particles selected from the group consisting of polyamide 6 powder, polyamide 9 powder, polyamide 11 powder, polyamide 12 powder, polyamide 6,6 powder, polyamide 612 powder, thermoplastic polyamide powder, polyamide copolymer powder, polyethylene powder, thermoplastic polyurethane powder, acrylonitrile butadiene styrene powder, polypropylene powder, polyester powder, polycarbonate powder, a polycarbonate and acrylonitrile butadiene styrene copolymer powder, a copolymer of polycarbonate and polyethylene terephthalate polyether ketone copolymer powder, polystyrene powder, and mixtures thereof;
      an optional inorganic filler selected from the group consisting of alumina, silica, titanium dioxide, and carbon nanotubes; and
      a redox-active inorganic salt mixed with the polymer particles;
   a fusing agent to selectively apply to a layer of the powder bed material, the fusing agent comprising water and an electromagnetic radiation absorber, wherein the electromagnetic radiation absorber absorbs electromagnetic radiation energy and converts the electromagnetic radiation energy to heat; and
   a radiant energy source positioned to expose the layer of powder bed material to electromagnetic radiation energy to selectively fuse the polymer particles in contact with the electromagnetic radiation absorber and thereby form a three-dimensional printed object.

14. The system of claim 13, wherein the redox-active inorganic salt is $K_2CrO_4$, $Na_2CrO_4$, $NaHCO_3$, $Na_2CO_3$, $Na_2SO_4$, NaOH, $K_4[Fe(CN)_6]$, or $K_3[Fe(CN)_6]$.

15. The system of claim 13, wherein the redox-active inorganic salt is present in the powder bed material in an amount ranging from about 0.1 wt % to about 5 wt %, with respect to a total weight of the powder bed material, and wherein the titanium dioxide is present in the powder bed material in an amount ranging from about 1 wt % to about 5 wt %, with respect to the total weight of the powder bed material.

16. The three-dimensional printing kit of claim 1, wherein the redox-active inorganic salt is $K_2CrO_4$, NaOH, $K_4[Fe(CN)_6]$, or $K_3[Fe(CN)_6]$.

17. The method of claim 7, wherein the redox-active inorganic salt is $K_2CrO_4$, NaOH, $K_4[Fe(CN)_6]$, or $K_3[Fe(CN)_6]$.

18. The system of claim 13, wherein the redox-active inorganic salt is $K_2CrO_4$, NaOH, $K_4[Fe(CN)_6]$, or $K_3[Fe(CN)_6]$.

* * * * *